US012641434B2

(12) United States Patent
Singh et al.

(10) Patent No.: US 12,641,434 B2
(45) Date of Patent: May 26, 2026

(54) ATTACK DETECTION FOR ULTRA-WIDEBAND HIGH-RATE PULSE OPTIMIZATION

(71) Applicant: Infineon Technologies AG, Neubiberg (DE)

(72) Inventors: Ajinder Pal Singh, Allen, TX (US); Daniel Lee, Salt Lake City, UT (US)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/678,080

(22) Filed: May 30, 2024

(65) Prior Publication Data

US 2025/0324259 A1 Oct. 16, 2025

Related U.S. Application Data

(63) Continuation-in-part of application No. 18/636,365, filed on Apr. 16, 2024.

(51) Int. Cl.
H04W 12/122 (2021.01)
H04B 1/7163 (2011.01)

(52) U.S. Cl.
CPC ........ H04W 12/122 (2021.01); H04B 1/7163 (2013.01)

(58) Field of Classification Search
CPC ....... H04B 1/7163; H04B 2201/71634; H04W 12/122
See application file for complete search history.

(56) References Cited

U.S. PATENT DOCUMENTS

| | | | | |
|---|---|---|---|---|
| 11,184,153 B2 * | 11/2021 | Hammerschmidt | .. | G01S 5/0072 |
| 11,792,058 B1 * | 10/2023 | Kim | ...................... | H04W 52/18 |
| | | | | 375/262 |
| 11,933,874 B2 * | 3/2024 | Han | ........................ | H04W 4/70 |
| 12,019,139 B2 * | 6/2024 | Kang | ................... | A61B 5/6893 |
| 12,306,284 B2 * | 5/2025 | Han | ........................ | H04W 4/70 |
| 2022/0295430 A1 * | 9/2022 | Schober | ............ | H04W 56/0055 |
| 2024/0077574 A1 * | 3/2024 | Joo | ..................... | G01S 13/0209 |

OTHER PUBLICATIONS

Giridhar Mandyam et al. "The Power to be Precise. UWB Secure Ranging in FiRa." Published in Aug. 2022.

(Continued)

*Primary Examiner* — Hosuk Song
(74) *Attorney, Agent, or Firm* — Eschweiler & Potashnik, LLC

(57) ABSTRACT

Systems, methods, and circuitries are provided for determining the likelihood that a malicious signal component is present in a UWB signal. In one example, a UWB receiver device is configured to receive a UWB signal during a ranging round; correlate the received UWB signal with a reference STS template to generate a correlation output; based on the correlation output, compute a channel quality indicator that characterizes a noise level of the channel; compute an attack-detection figure of merit (A-D FOM) based on the channel quality indicator, a block error of the received UWB signal, or a frequency error of the received UWB signal; and provide data indicative of the A-D FOM to a controller device.

20 Claims, 6 Drawing Sheets

(56) References Cited

OTHER PUBLICATIONS

Patrick Leu et al. "Ghost Peak: Practical Distance Reduction Attacks Against HRP UWB Ranging".
Frank Leong et al. IEEE P802.15 Wireless Personal Area Networks. Published Jul. 2018.
Dieter Coppens et al. An Overview of UWB Standards and Organizations (IEEE 802.15.4, FiRa, Apple): Interoperability Aspects and Future Research Directions. Published Jun. 29, 2022.
Mridula Singh et al. "Security Analysis of IEEE 802. 154z/HRP UWB Time-of-Flight Distance Measurement".
Yong Shi. "High Rate Pulse Ultrawideband Physical Layer Testing and Certification" Version 01.00.

* cited by examiner

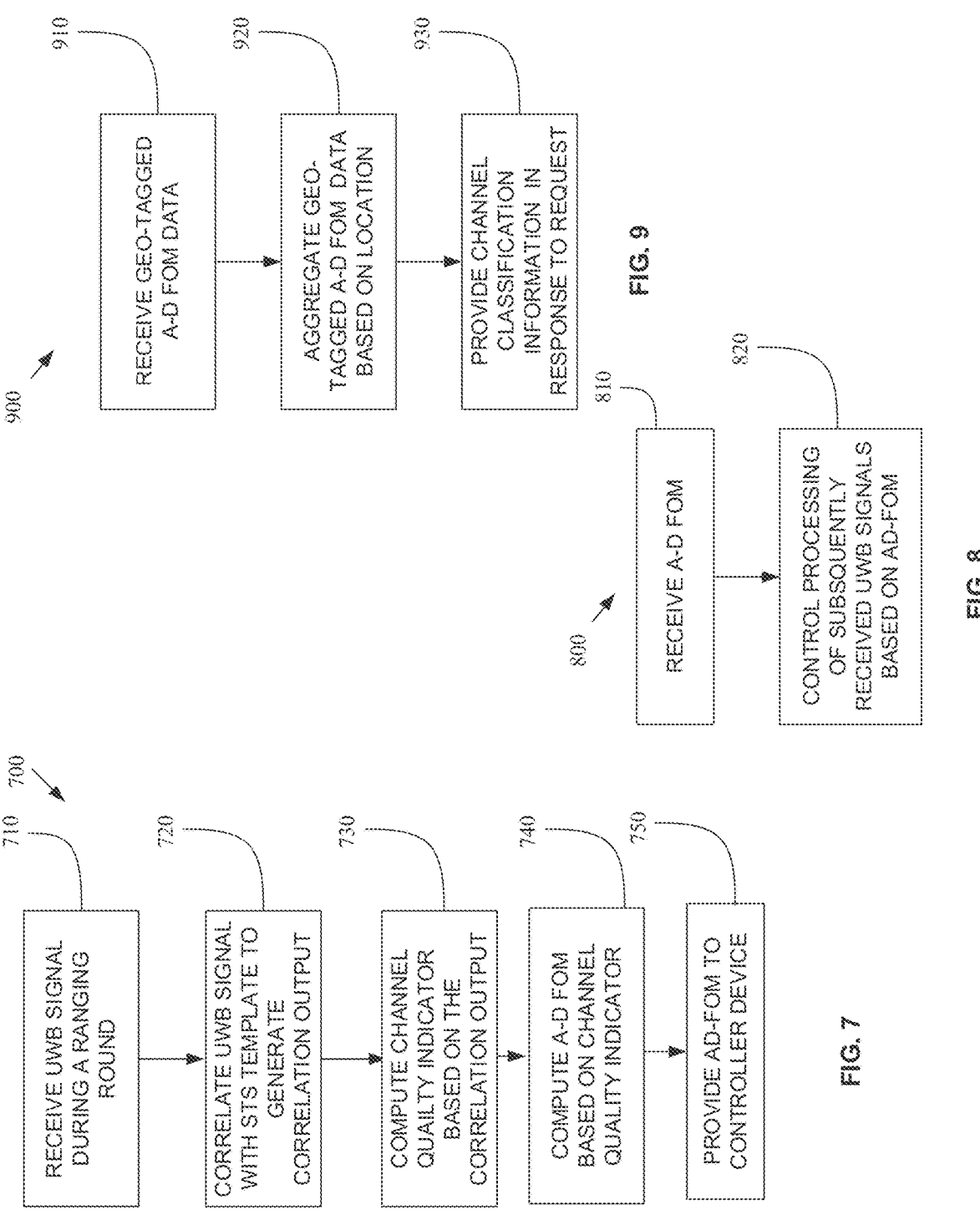

910 RECEIVE GEO-TAGGED A-D FOM DATA

920 AGGREGATE GEO-TAGGED A-D FOM DATA BASED ON LOCATION

930 PROVIDE CHANNEL CLASSIFICATION INFORMATION IN RESPONSE TO REQUEST

810 RECEIVE A-D FOM

820 CONTROL PROCESSING OF SUBSQUENTLY RECEIVED UWB SIGNALS BASED ON AD-FOM

710 RECEIVE UWB SIGNAL DURING A RANGING ROUND

720 CORRELATE UWB SIGNAL WITH STS TEMPLATE TO GENERATE CORRELATION OUTPUT

730 COMPUTE CHANNEL QUAILTY INDICATOR BASED ON THE CORRELATION OUTPUT

740 COMPUTE A-D FOM BASED ON CHANNEL QUALITY INDICATOR

750 PROVIDE AD-FOM TO CONTROLLER DEVICE

ATTACK DETECTION FOR ULTRA-WIDEBAND HIGH-RATE PULSE OPTIMIZATION

CROSS-REFERENCE TO RELATED APPLICATIONS

This application a Continuation in Part of U.S. patent application Ser. No. 18/636,365 filed on Apr. 16, 2024 and entitled secure training sequence confidence level FIGURES OF MERIT FOR ULTRA-WIDEBAND HIGH-RATE PULSE OPTIMIZATION, the contents of which are hereby incorporated by reference in their entirety.

FIELD

The present disclosure relates generally to the field of processors and in particular to processors for ultra-wideband (UWB) signals

BACKGROUND

Ultra-wideband signals are well suited for secure ranging techniques because these signals enable accurate distance measurement between devices.

BRIEF DESCRIPTION OF THE DRAWINGS

Some examples of circuits, apparatuses and/or methods will be described in the following by way of example only. In this context, reference will be made to the accompanying Figures.

FIG. 7 is a flow diagram outlining an exemplary method of aggregating STS CLFOM data to generate channel condition information, in accordance with various aspects described.

DETAILED DESCRIPTION

Figure 1:
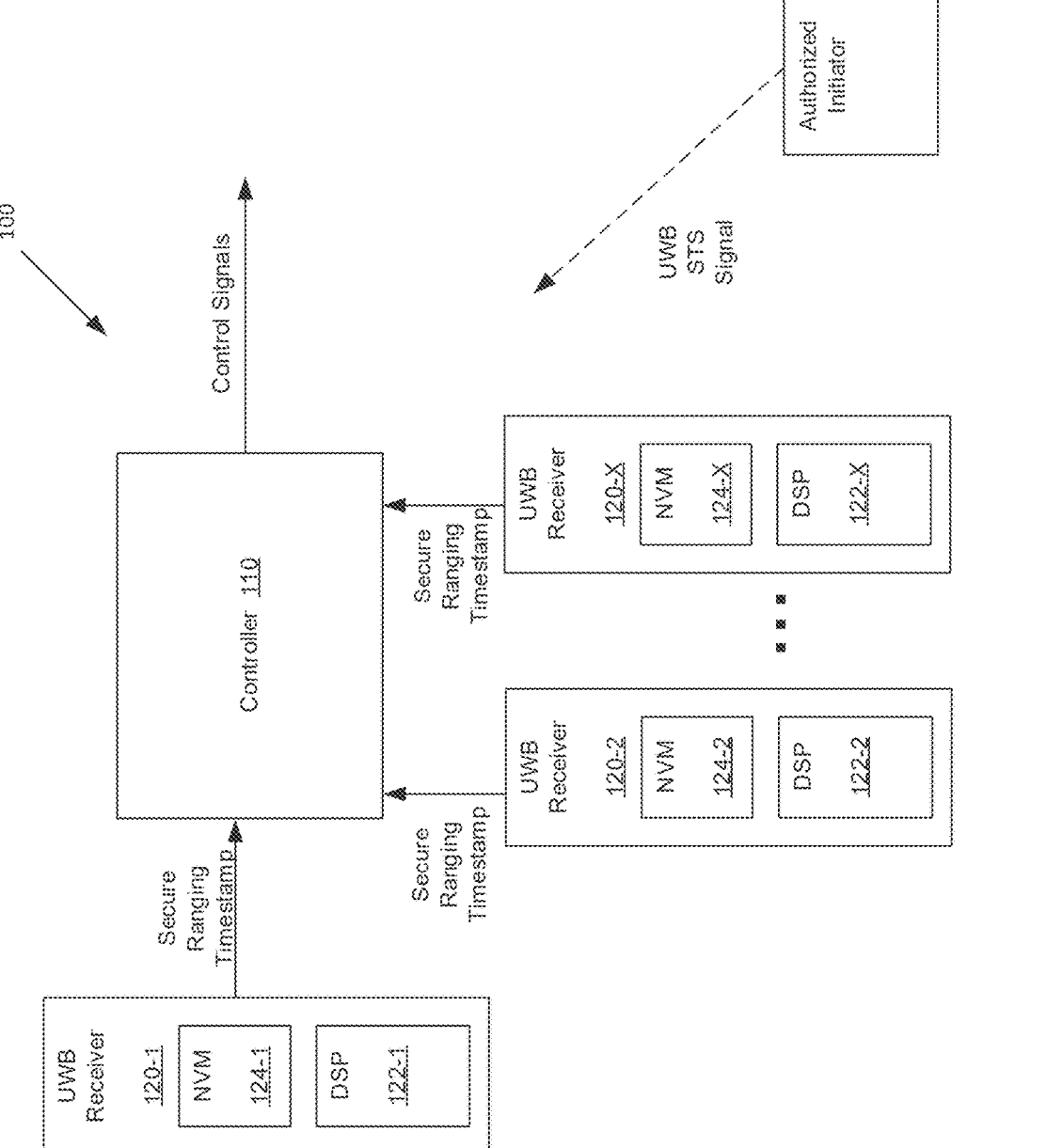
FIG. 1 is a block diagram of an exemplary access control system that analyzes received UWB secure training sequence (STS) signals to determine whether an authorized user is proximate to a controller.

The present disclosure is described with reference to the attached figures. Similar components in various figures may be represented by similar reference characters. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Secure ranging is the process of precise detection of the distance between a radio transmitter and receiver. If the distance between the transmitter and the receiver is within a pre-specified limit, then some form of authorization, usually in the form of physical access, such as unlocking a door, may be performed by the receiver. Ultra-wideband (UWB) radio technology has seen increased adoption in secure ranging due to the waveform's ability to support accurate Time-of-Flight (ToF) estimation and therein a determination of relative position.

UWB secure ranging solutions may follow the IEEE 802.15.4z ranging standard, which was finalized in 2020. This standard enhanced the existing IEEE802.15.4a ranging standard with new integrity features, allowing more precise and secure ranging. Another relevant standard is the Car Connectivity Consortium CCC standard which provides an industry standard for secure ranging between UWB receivers installed in automobiles and initiator devices such as fobs or smartphones.

IEEE 802.15.4z standardizes two modes of ranging operation: Low-Rate Pulse (LRP) and High-Rate Pulse (HRP). Packet formats, implementation, and security of LRP and HRP differ. The differences between LRP and HRP are primarily due to UWB being a wide band technology. To limit interference, regulators restrict the output power of UWB receivers in proportion to their communication rate. Under these regulations, as the pulse rate increases, the maximum allowed transmission power per pulse should decrease. LRP pulses may therefore be transmitted at a higher power than HRP pulses, and in many scenarios individual pulses can be detected and decoded by the receiver.

In contrast, due to the lower transmission power of HRP pulse, in many application scenarios individual HRP pulses may not detectable by the receiver. HRP mode thus requires that the energy is split up into many pulses to transmit information successfully. The security concept of HRP reflects the fact that HRP pulses are low power and to enhance security, HRP pulses encode what is referred to as a random secure training sequence, a scrambled time sequence, or a scrambled timestamp sequence (referred to interchangeably as STS). The STS may be up to 4096 HRP pulses long and is transmitted in a packet by the initiator. The receiver detects the STS through autocorrelation with a stored reference STS template. Typically, one of the correlation peaks is used to determine the time of arrival of the packet. Contrary to LRP where the polarity of each pulse is detected, HRP receivers calculate some aggregate statistic over the received pulses in order to determine the time of arrival (ToA) of a transmitted UWB STS signal.

FIG. 1 illustrates a secure ranging system 100 that includes a controller 110 and several UWB receivers (e.g., anchors) 120-1 through 120-X. As will be seen in FIG. 2, the controller and/or each of the UWB receivers may be implemented on separate system on chips (SoCs). Each UWB receiver includes a digital signal processing (DSP) processor 122 and non-volatile memory (NVM) 124. The DSP processor 122 includes one or more cores and is configured to correlate a received UWB STS signal with a reference STS template stored in the NVM. The reference STS template is derived from a pre-derived UWB Ranging round key (URSK), which is derived from a key seed by a Key Derivative Function of the UWB receiver and by a negotiated STS frame index. The UWB receiver 120 determines a secure ranging timestamp based on a correlation of the received signal and the template and provides the secure ranging timestamp to the controller. The secure ranging timestamp encodes a time of arrival of the STS packet.

The controller 110 may determine the position of the authorized initiator based on a difference between the secure ranging timestamps from the multiple UWB receivers 120-1 through 120-X. When the determined position is within the prescribed radius of the controller, the controller 110 provides one or more control signals to other components. The control signals may cause actuation of selected components, such as a vehicle's door lock, a garage door, comfort or entertainment features, and so on, in response to an authorized person approaching the secure ranging system.

As per IEEE 802.15.4z, in a ranging round the UWB receiver 120 computes a computed channel impulse response ($\widehat{CIR}$) for a received UWB STS signal by correlating the incoming signal with a locally stored reference STS template (e.g., stored in NVM 124). Based on the computed $\widehat{CIR}$, the UWB receiver can determine the time of arrival (ToA) of the UWB STS signal, which is in turn reported to the controller 110 as a secure ranging timestamp. In other words, having received the UWB STS signal, the signal after the receiver is $$RX(t) = STS(t) * CIR(t) \qquad \text{EQ1}$$

Then the UWB receiver computes $$\widehat{CIR}(t) = RX(t) *^{-1} STS_{local(t)} \qquad \text{EQ2}$$

where $STS_{local(t)}$ is the stored reference STS template.

Figure 2:
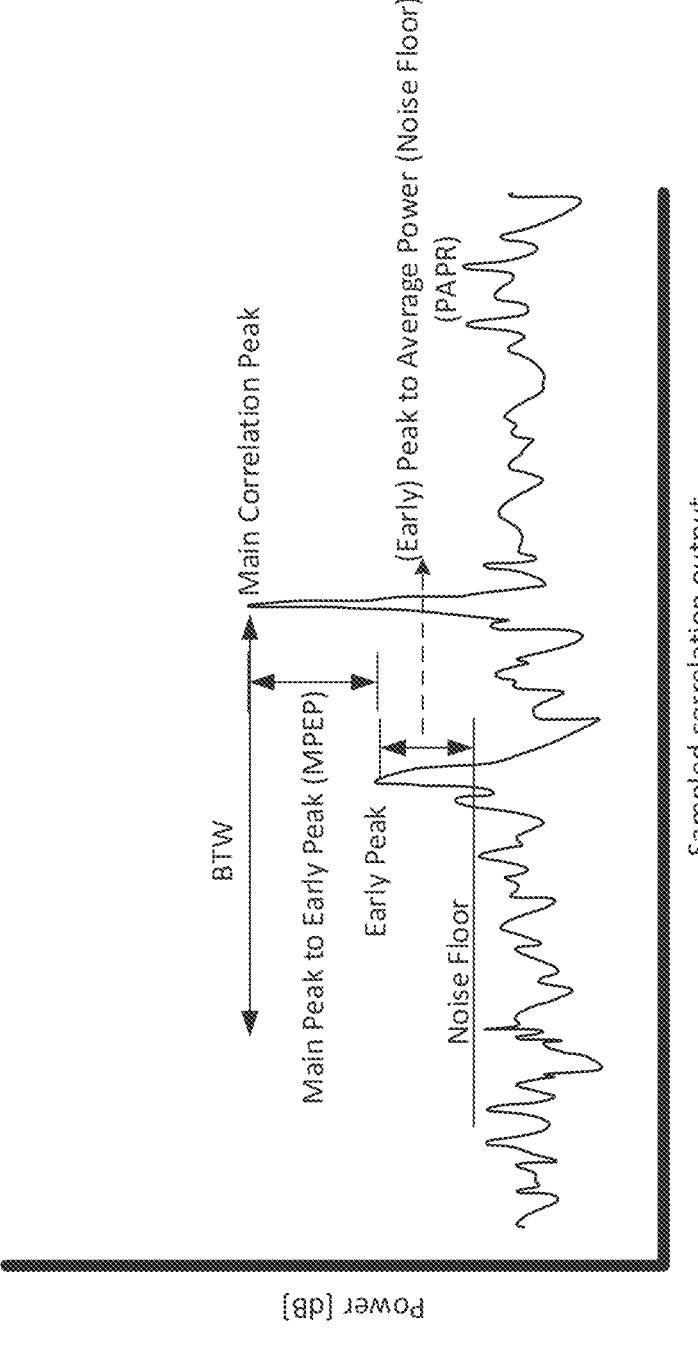
FIG. 2 illustrates an exemplary sampled correlation output.

FIG. 2 illustrates an example sampled correlation output computed based on a received UWB STS signal. The sampled correlation output may be the output of a correlation operation performed by a DSP core 122 of FIG. 1. An early peak, a main or maximum peak, and a noise floor are labeled in the sampled correlation output. The main correlation peak does not always represent the direct path between the two ranging devices, which is the path that best indicates the distance between the ranging devices. This can occur when the ranging devices are not within line-of-sight of each other, or an indirect path experiences constructive interference leading to a higher peak than the direct path. Therefore, the UWB receiver considers any peak above the noise floor as a possible candidate for distance estimation. Once the UWB receiver detects a peak of a certain magnitude the UWB receiver then performs a comparison with any other peaks in the vicinity that originate from a different, but shorter path. The time window that specifies the search region is referred to as a back-search time window (BTW).

The UWB secure ranging process relies on an accurate estimate of the noise floor on the communication channel in order to determine if a correlation peak stems from the transmitted STS signal or is an artifact of the channel. If the noise floor estimate is too high, the UWB receiver might misclassify lower-amplitude peaks generated by a non-line-of-sight path as noise. However, a noise floor estimate that is too low may lead to misidentifying noise as correlation peaks associated with the transmitted STS signal, which can degrade the accuracy of the determined ToA.

The UWB receiver detects peaks based on peak detection thresholds, which specify how far peaks stand out with respect to the noise floor. Due to multi-path, the correlation of the incoming signal with the reference STS template can produce many correlation peaks at different points in time and with varying amplitudes. Peak power for all the correlation peaks as observed by the UWB receiver during the BTW is analyzed by the UWB receiver against the peak detection thresholds.

Having computed correlation between the received STS signal and the reference STS template, the receiver has compiled a set of (arrival-time (ToA), power (P)) pairs defined in correlation-space S as $$S = \{(ToA_0, P_0), \ldots, (ToA_n, P_n)\}$$

From amongst these peaks, the UWB receiver identifies the earliest peak as a true STS peak if certain criteria are met. One such criterion is that the difference between the peaks does not exceed a maximal peak to early peak ratio (MPEP) threshold. Another criterion is a minimum peak to average power ratio (PAPR) which is the ratio between the power of the early peak and the noise floor. This criterion ensures that the chosen peak sufficiently exceeds the noise floor.

Thus, many factors are taken into consideration to identify the correlation peak that corresponds to the true distance between the transmitter and receiver. The length of the back-search time window (BTW), the estimated noise floor, and peak detection thresholds are examples of configurable secure ranging parameters whose values affect the performance and accuracy of STS detection. These are examples of STS processing parameters that may be tweaked over time by learning a given channel over time. Adjusting the secure ranging parameters based on a derived channel quality such as a number of potentially interfering devices or security (e.g., a busy parking lot vs. a home garage) may allow for increased ranging performance when security and interference are not a major factor. As will be discussed in more detail below, the secure ranging parameters may be adjusted over time as different aspects of a channel (mapped to a geographic location) are learned. This enables the optimization of power and performance versus security based on the derived STS learnings for a given set of channels.

Further, secure ranging parameters may be selected based on learned channel characteristics of a given geographic location. For example, a controller learns (e.g., with assistance from a cloud-based service) that the current environment is typically noisy, the controller may send data to the UWB receiver devices that the noise floor is to be assumed to be higher than in other locations. In response, the UWB receiver device may adjust the algorithm used to detect peaks to use a higher parameter value for the noise floor. This means that a figure of merit of the confidence level becomes larger at given UWB signal peaks and given actual noise as compared to quieter locations.

Figure 3:
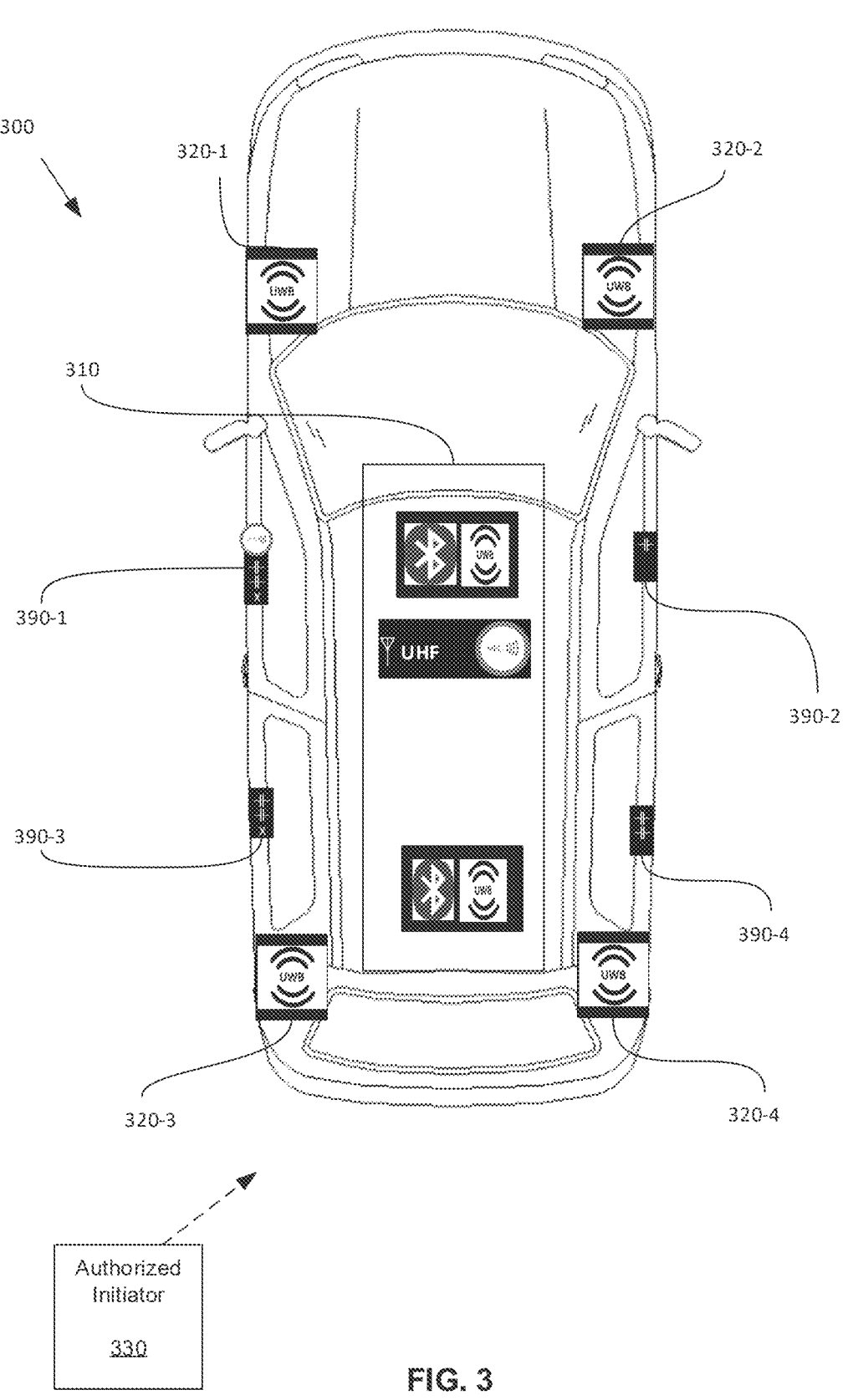
FIG. 3 is a block diagram of a vehicle access control system.

FIG. 3 is a block diagram of an exemplary vehicle access control system 300. In this particular example of an access control system, a vehicle includes a body domain controller (BDC) 310, four door handles 390-1,390-2,390-3,390-4, and four anchor devices 320-1,320-2,320-3,320-4. The body domain controller 310 performs similar functions to the controller 110 and 410 of FIGS. 1 and 4. The anchor devices

Figure 4:
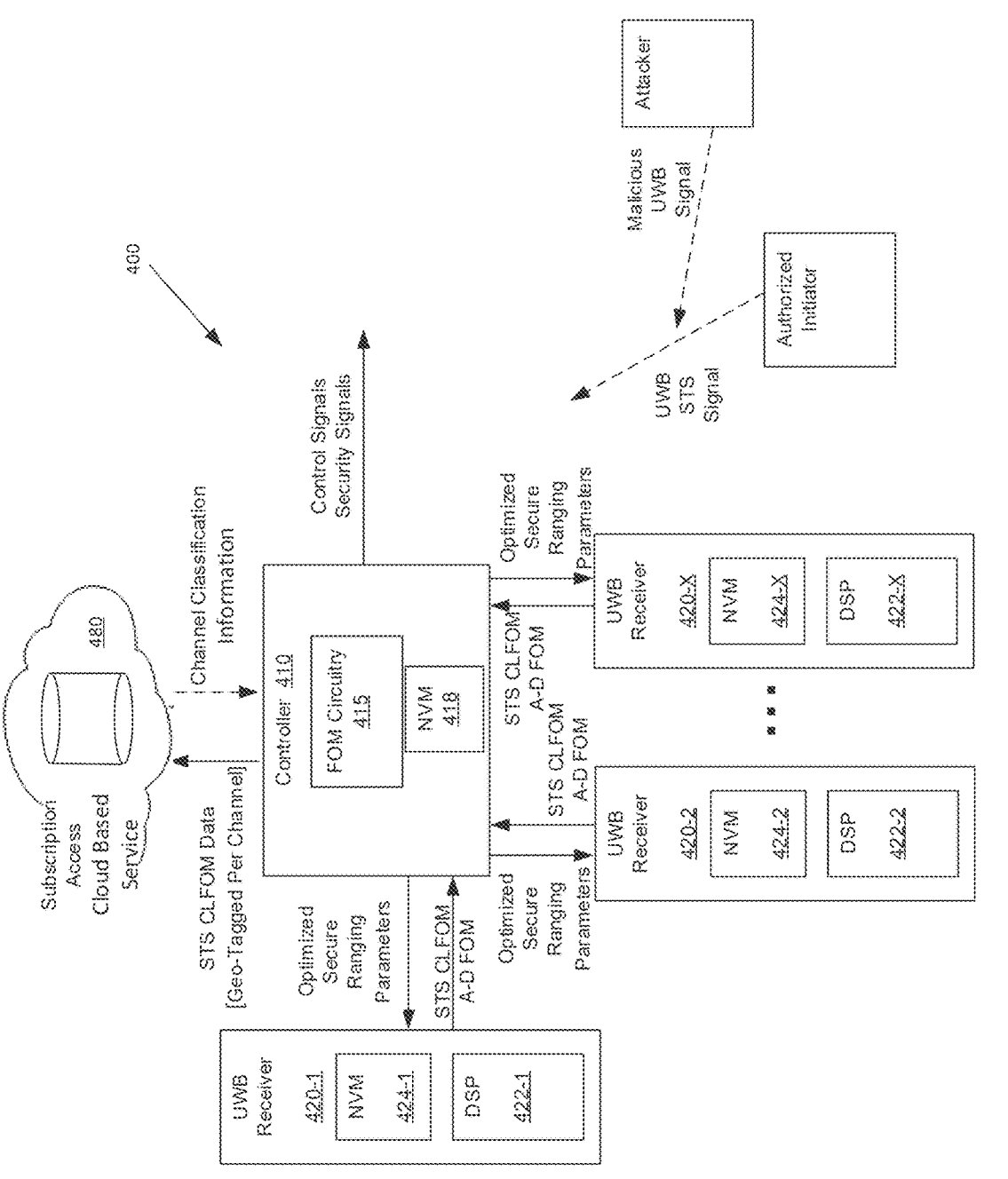
FIG. 4 is a block diagram of an exemplary access control system that computes one or more STS confidence level figures of merit (STS CLFOM) that characterize an aspect of a secure ranging round, in accordance with various aspects described.

320 perform similar functions to the UWB receiver devices 120 and 420 of FIGS. 1 and 4. The anchor devices 320 include UWB transceivers.

The system 300 includes at least one authorized initiator device 330 such as a key fob, a smart card, or a smartphone with an access application installed. During an initiation process, URSK secrets are derived and stored in a secure enclave of the anchor devices 320 and the authorized initiator device 330. The reference STS template will be derived from the USRK secrets and will be used to correlate the received STS signal with the reference STS template. The authorized initiator device 330 uses the reference STS template to generate a UWB STS signal that is transmitted toward the vehicle access control system 300.

Each UWB anchor device 320 receives and processes a UWB STS signal as described with reference to FIG. 2 to determine a secure ranging timestamp that indicates a ToA of the UWB STS signal at the anchor device 320. The secure ranging timestamp is transmitted to the body domain controller 310, which uses the secure ranging timestamps from one or more of the anchor devices 320 to determine whether the authorized initiator device 330 is within a predetermined secure range of the vehicle access control system 300. When the body domain controller 310 determines that the authorized initiator device 330 is within range of the system 300, the body domain controller transmits an access signal to one or more of the door handles 390 to actuate components that unlock the door handle(s). The vehicle access control system 300 of FIG. 3 is just one example of access control systems that may benefit from the STS confidence level figure of merit techniques disclosed herein.

Due to their higher repetition frequency and relatively low power, HRP pulses can be severely affected by noise and in addition channel artifacts lead to inter-pulse interference. However, securing HRP based secure ranging systems against distance shortening attacks and potential interfering signals significantly degrades performance.

Described herein are systems methods and techniques for generating a STS confidence level figure of merit (STS CLFOM) that indicates a confidence level related to the quality of a channel in which an STS signal is received (e.g., interference level, obstacles, and so on). Based on the STS CLFOM, an attack-detection (A-D) FOM may be computed that indicates a likelihood that a received STS signal is subject to a distance shortening attack. The A-D FOM may be used to trigger a security response when an attack is detected. Further, accumulated A-D FOM may be tagged with a geographic location in which the associated secure ranging round was performed. In this manner the A-D FOM may be used to differently optimize the performance of HRP secure ranging in benign locations such as a home garage as compared to locations in which distance shortening or other attacks have been detected.

FIG. 4 is a block diagram of an exemplary access control system 400 in which UWB receivers 420 compute at least one STS CLFOM that characterizes a confidence level (e.g., interference level) of the channel as well as an A-D FOM that characterizes a likelihood that a malicious UWB signal is present. he STS CLFOM and A-D FOM are provided to a controller 410. The controller 410 includes figure of merit circuitry 415 that stores and analyzes the STS CLFOM and A-D FOM for use in subsequent processing of UWB STS signals. For example, based on STS CLFOM and/or A-D FOM, the confidence level figure of merit circuitry 415 may determine optimized secure ranging parameters for use by the UWB receivers in determining a secure ranging timestamp, may adapt parameters used in generating the control signals, or may generate a security signal as will be described in more detail below.

Additionally, the FOM circuitry 415 or UWB receivers 420 may geo-tag STS CLFOM and/or A-D FOM or associated data with an indication of a geographic location in which the STS CLFOM or A-D FOM was generated. In this manner, stored STS CLFOM and/or A-D FOM may be mapped to particular geographic locations for use in processing subsequent UWB STS signals received when the controller 410 returns to a previously visited location. The FOM circuitry 415 may determine the geographic location of the system 400 based on a location associated with a network to which the access system is proximate (e.g., based on network-identifying signals) or connected (e.g., home WiFi network or cellular network cell).

In some examples, the controller 410 may transmit geo-tagged STS CLFOM and/or A-D FOM to a cloud-based service 480 that aggregates geo-tagged STS CLFOM and/or A-D FOM for many vehicles or access systems based on geographic location. The cloud-based service 480 may use artificial intelligence or machine learning techniques to analyze the received STS CLFOM and/or A-D FOM for each location and generate channel classification information for each location. The cloud-based service 480 may determine historic trends or make projections of channel behavior based on the received STS CLFOM and/or A-D FOM. Subscribers to the cloud-based service may retrieve channel classification information for a given location for use in processing UWB STS signals while at the location. The channel classification information may be, for example, an indication of the quality (e.g., level of interference) of the UWB channel at the location or an indication of attack likelihood at the location. Secure ranging parameters used by the UWB receivers 420 may be adjusted based on the received channel classification indication.

In some examples, a DSP processor 422 of each UWB receiver 420 computes the STS CLFOM and/or A-D FOM for each secure ranging round. In some examples, selected STS CLFOM and/or A-D FOM, average STS CLFOM and/or A-D FOM, and so on may be saved in NVM 424 or NVM 418. The DSP processor 422 may be configured to determine an STS CLFOM and/or A-D FOM for every secure ranging round, on a periodic basis, in response to a control signal from the controller, or in response to an occurrence of certain trigger criteria. The rate at which STS CLFOM and/or A-D FOM are generated by UWB receivers 420 and/or provided to the FOM circuitry 415 may vary between different STS CLFOM and/or A-D FOM. For example, an and/or A-D FOM that indicates an attack is likely occurring may be computed in each ranging round due to security considerations while other STS CLFOM may not be computed in every ranging round by every UWB receiver.

STS CLFOM and/or A-D FOM may be stored on a short term basis in NVM 418 of the controller 410. For example, STS CLFOM and/or A-D FOM may be stored for as long as a given signing key is active. Geo-tagged STS CLFOM or and/or A-D FOM may be stored on a long term basis by the cloud-based service 480. Certain STS CLFOM and/or A-D FOM may not be stored for as long as others, for example, A-D FOM may not be stored beyond a given ranging round.

The STS CLFOM and A-D FOM will now be disclosed in some detail. Many of the disclosed techniques are applicable to any other STS CLFOM that characterizes some aspect of a secure ranging round.

STS Confidence Level Figure of Merit

An example STS CLFOM characterizes a quality of the channel in which a UWB STS signal is received, in terms of interference or noise level. In some examples, a DSP processor 422 of each UWB receiver 420 computes the STS CLFOM based on a correlation error between a received UWB STS signal and the reference STS template. In one particular example, the STS CLFOM is a function that generates a value based on the correlation error, a main peak to early peak (MPEP) differential of the correlation output, an early peak to noise floor or PAPR differential of the correlation output, and a noise floor of the correlation output.

The correlation error may be derived from processing $$\hat{CIR}(t) = RX(t) *^{-1} STS_{local(t)}$$

and determining a difference between the estimated channel impulse response and an ideal channel impulse response.

The MPEP differential may be derived by processing the correlation space as $$S = \{(ToA_0, P_0), \ldots, (ToA_n, P_n)\} \text{ wherein}$$

$$\frac{P_{main\_peak}}{P_{early\_peak}} < MPEP.$$

The early peak to noise floor differential or PAPR differential may be derived by processing the correlation space as $$S = \{(ToA_0, P_0), \ldots, (ToA_n, P_n)\} \text{ wherein}$$

$$\frac{P_{main\_peak}}{P_{average\_power}} \geq PAPR.$$

The noise floor may be derived by processing the correlation space as $$S = \{(ToA_0, P_0), \ldots, (ToA_n, P_n)\}$$

The correlation error, MPEP differential, PAPR differential, and noise floor of the correlation output for each ranging round are stored in the NVM 424 and used to compute the STS CLFOM. The STS CLFOM is a function of the correlation error, MPEP differential, PAPR differential, and noise floor of the correlation. The function may vary depending on the channel. The STS CLFOM may be provided to the controller 410 which may aggregate the STS CLFOM received from different UWB receiver devices 420. The controller 410 may geo-tag and aggregate the STS CLFOM to generate an overall STS CLFOM for a particular channel/geographic location. Optimized secure ranging parameters such as a back-search time window, estimated noise floor, or peak detection thresholds may be determined by the FOM circuitry 415 based on the received STS CLFOM. When the system 400 returns to a location mapped to a given channel quality STS CLFOM, previously computed optimized secure ranging parameters may be provided to the UWB receivers 420 for use adapting parameters used in secure ranging.

For example, a relatively high STS CLFOM may result in modification of secure ranging parameters such as lowering of the estimated noise floor or peak detection thresholds. This may improve the performance of the secure ranging process and reduce power consumption. On the other hand, a relatively low STS CLFOM may result in a different modification of secure ranging parameters such as increasing of the estimated noise floor or peak detection thresholds in anticipation of a lower quality channel at the expense of additional ranging rounds and increased power consumption. Optimized secure ranging parameters may be determined by the controller 410 based on the STS CLFOM. Alternatively, the optimized secure ranging parameters may be computed by the cloud based service and provided to the controller 410 based on the a location of the system 400. In either case, the controller 410 provides the optimized secure ranging parameters to the UWB receivers 420.

Additionally, aggregated STS CLFOM data may be analyzed by either the controller 410 or the cloud based service 480 to identify trends in channel quality for different locations. This trend information may be useful to identify locations in which channel quality is degraded so that, for example, remedial action may be taken or recommended.

Attack Detection Figure of Merit

As already discussed, to detect the presence of an authorized initiator the UWB receiver computes the channel impulse response of a received UWB STS signal. In some distance-shortening attacks, such as a cicada++ attacks, an attacker transmits a malicious UWB signal that includes random pulses at a fraction of the pulse rate of HRP pulses in the UWB STS signal. The pulses in the malicious UWB signal are stronger than the HRP pulses based on the ratio between the periodicity of the HRP pulses and the malicious pulses. For example, if the malicious pulses are transmitted at a quarter of the rate of the HRP pulses then the malicious pulses may be four times stronger than the HRP pulses. In the presence of the malicious pulse, a majority of the legitimate UWB STS signal is still received and the UWB receiver may successfully correlate the UWB STS signal but observe an early correlation peak that is the result of a malicious pulse. If the added early correlation peak meets the secure ranging parameters (e.g., MPEP, PAPR, and so on), the UWB receiver 420 derives an erroneously short ToA or distance between the authorized initiator and the system 400. This may allow an attacker to gain access when the authorized user is not proximate the access control system 400. In order to address increasingly sophisticated attacks, STS specifications have become more complex with added component cost, processing capabilities, and power consumption.

For each ranging round, the UWB receivers 420 may compute an attack-detection figure of merit (A-D FOM). The A-D FOM indicates a likelihood that a received signal UWB STS signal includes malicious components. The A-D FOM is based on a channel quality indicator, such as the STS CLFOM, for the channel, which means that the A-D FOM distinguishes between channel noise (based on channel quality as characterized by the STS CLFOM) and regular, possibly malicious, pulses. In some examples, the A-D FOM is computed using a function that generates a value based on the STS CLFOM disclosed above, a block error value, and a frequency error value.

Figures 5, 6:
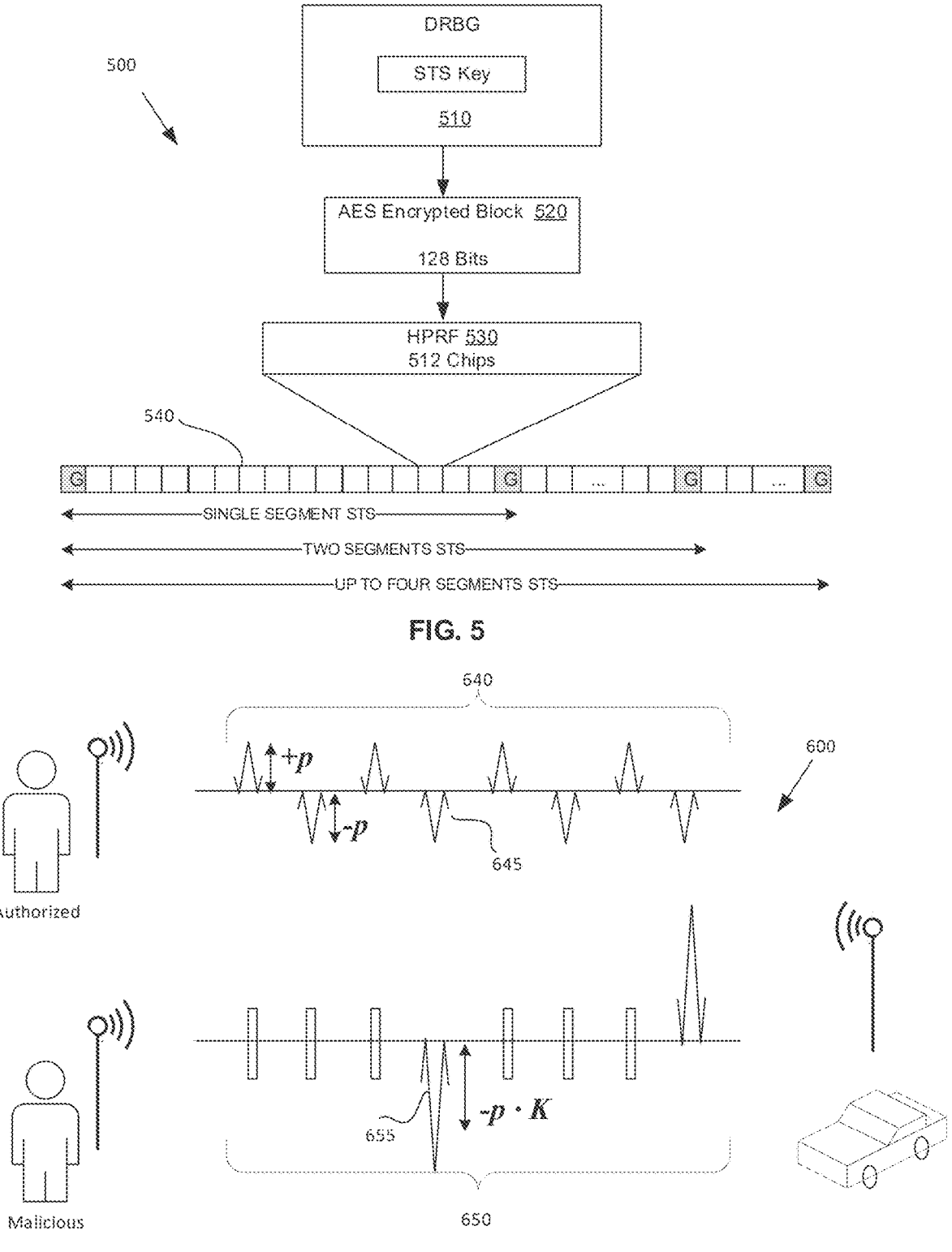
FIG. 5 is a flow diagram outlining an exemplary method of computing an STS CLFOM, in accordance with various aspects described.
FIG. 6 is a flow diagram outlining an exemplary method of controlling processing of UWB signals based on STS CLFOM data, in accordance with various aspects described.

FIG. 5 illustrates an exemplary sequence 500 of processing steps performed by a UWB STS signal transmitter to generate a UWB STS signal 540. Recall that the UWB initiator device stores a URSK (STS key) that is known by the UWB receiver device. The initiator device includes a deterministic random bit generator (DRBG) 510 that combines a set of 96 bits (derived from URSK) and a 32 bit counter to generate 128 data bits. The STS key is used to encrypt the 128 data bits to form a 128 bit Advanced Encryption Standard (AES) encrypted block 520 (also called word). A delta spreading function is applied to the 128 bit block to generate a high pulse repetition frequency (HPRF) signal comprised of 512 chips. The STS signal 540 includes between one and four segments. While FIG. 5 illustrates one particular example of numbers of bits in encrypted blocks, number of chips in HPRF signal, number of HPRF signals in STS segments, and so on, in other examples different numbers of bits, chips, HPRF signals, and so on or other encryption techniques may be used to generate the UWB STS signal.

Recall that the UWB receiver also stores the STS key/template. AES128 encryption as specified in CCC is based on CTR mode or counter mode. Here a bad block only affects the current block unlike cipher-block chaining (CBC) and cipher-feedback (CFB), where a bad block affects all following blocks. This supports parallel computing which means both encryption and decryption of bocks can be done in parallel. The UWB receiver compares blocks carried by the received UWB STS signal to blocks in the reference STS template to determine a block error value. A high block error value and a pattern associated with how blocks are failing as correlated to the fractional high energy pulse insertion may indicate the presence of regular malicious pulses. The A-D FOM is computed based on the block error value.

FIG. 6 illustrates a distance-shortening attack 600. An authorized UWB transmitter transmits a UWB STS signal 640 which, as described with reference to FIG. 5, includes a sequence of positive and negative pulses corresponding to chips. An attacker transmits a malicious UWB signal 650 that includes random pulses at 1/K of the rate of the HRP pulses. The malicious pulses are K times stronger than the pulses of the UWB STS signal 640. In FIG. 6, K is 4. It can be seen that at a vehicle-based receiver the malicious pulse 655 will combine with the authorized pulse 645 to create a false peak in the received UWB signal. This means that the UWB receiver may successfully correlate the UWB STS signal but erroneously observe this combined pulse as an early correlation peak.

The UWB receiver may derive a frequency error value by taking a fast Fourier transform (FFT) of the received UWB STS waveform. Malicious pulses at a fractional frequency (1/K) with respect to the HRP frequency K will be have significantly higher energy for the 1/K frequency as compared to when there is no attack and thus this type of malicious signal can be detected with the FFT. The A-D FOM is computed based on the frequency error value.

In the disclosed example, the A-D FOM is computed based on the STS CLFOM disclosed above, a block error value, and a frequency error value. Other channel quality indicators that characterize a channel quality in terms of channel noise or interference may be used to derive the A-D FOM instead of or in addition to an STS CLFOM computed as per above.

Returning to FIG. 4, the controller 410 may generate a security signal when an A-D FOM exceeds a threshold value. The security signal may trigger an alert to a user, an audible or visible alarm, a lockout feature that prevents access for a predetermined time period, and so on. The security signal may be provided to an application in execution on a processor associated with the vehicle or a mobile device carried by the user. The application may provide an alert to the user and allow the user to control subsequent actions taken by the controller. The controller 410 may provide geo-tagged A-D FOM to the cloud-based service 480 for use in identifying "dangerous" locations in which the system 400 or systems in other vehicles have experienced attacks. When the system 400 is in such a location, different, more stringent, optimized secure ranging parameters may be provided to the UWB receivers for more securely detecting STS signals. For examples, more ranging sessions may be performed and the A-D FOM may computed to build confidence in the A-D FOM and analyze the results to determine a pattern of failure.

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term indicate when used with reference to some entity (e.g., parameter or setting) or value of an entity is to be construed broadly as encompassing any manner of communicating the entity or value of the entity either explicitly or implicitly. For example, bits within a transmitted message may be used to explicitly encode an indicated value or may encode an index or other indicator that is mapped to the indicated value by prior configuration. The absence of a field within a message may implicitly indicate a value of an entity based on prior configuration.

As used herein, the term provide when used with reference to information or data or a signal encoding data is to be construed broadly as encompassing any manner of communicating the information, data, or signal encoding data either explicitly or implicitly. "Provide" should be construed to encompass transmitting a message that indicates the information or data, storing the information or data in memory accessible to the recipient of the providing, controlling electrical signals on conductors in a circuit to encode the information or data, and so on.

As used herein, the term obtain when used with reference to information or data or a signal encoding data is to be construed broadly as encompassing any manner of receiving the information, data, or signal encoding data either explicitly or implicitly. "Obtain" should be construed to encompass receiving a message that indicates the information or data, reading the information or data from memory, performing computations or processing on other data to obtain the information or data, detecting electrical signals on conductors in a circuit detect the information or data, and so on.

FIG. 7 is a flow diagram outlining a method 700 for processing a UWB signal. The method 700 may be performed by a UWB receiver device, such as device 320 or 420 of FIGS. 3 and 4, respectively. The method includes, at 710, receiving a UWB signal during a ranging round. At 720, the received UWB signal is correlated with a reference secure training sequence (STS) template to generate a correlation output. At 730, based on the correlation output, a channel quality indicator that characterizes a noise level of the channel is computed. At 740, the method includes computing an attack-detection figure of merit (A-D FOM) based on the channel quality indicator, a block error of the received UWB signal, or a frequency error of the received UWB signal. The method includes, at 750, providing data indicative of the A-D FOM to a controller device.

The method may include providing the A-D FOM to the controller device in every ranging round, periodically, and/ or in response to a request from the controller device. As disclosed with reference to FIG. 2, the channel quality indicator for the ranging round may be computed based on a main peak to early peak (MPEP) differential of the correlation output, an early peak to noise floor differential of the correlation output, and a noise floor of the correlation output.

FIG. 8 is a flow diagram outlining a method 800 for processing a UWB signal. The method 800 may be performed by the controller device 310 or 410 of FIGS. 3 and 4, respectively. The method includes, at 810, receiving data indicative of an attack-detection figure of merit (A-D FOM). The A-D FOM is based on a correlation between a UWB signal received by a first UWB receiver device and a reference STS template, a block error of the UWB signal, or a frequency error of the UWB signal.

At 820, the method includes controlling processing of subsequently received UWB signals based on the data. The method may include determining at least one optimized secure ranging parameter based on the A-D FOM and providing the at least one optimized securing ranging parameter to a second UWB receiver device for use in processing received UWB signals. The at least one optimized secure ranging parameter may include parameters related to a back-search time window, noise floor estimation, or a peak detection threshold. The method may include generating a security signal in response to the A-D FOM exceeding a threshold.

The method may include tagging the A-D FOM with an indication of a geographic location of the controller device to generate geo-tagged A-D FOM data; and transmitting the geo-tagged A-D FOM data or data derived from the geo-tagged A-D FOM data to a second device that hosts a repository of tagged A-D FOM data. The method may include determining a geographic location of the controller device and controlling processing of subsequently received UWB signals based on geo-tagged A-D FOM data mapped to the geographic location. The method may include requesting channel classification information for a current location of the controller device from a second device. The channel classification may be based on A-D FOM data collected from a plurality of UWB receiver devices. Processing of subsequently received UWB signals may be controlled based on the channel classification information received from the second device.

FIG. 9 is a flow diagram outlining a method 900 for processing a UWB signal. The method may be performed by a device associated with a cloud based service 480 of FIG.

4. The method includes, at 910, receiving geo-tagged attack-detection figure of merit (A-D FOM) data. The A-D FOM data is based on a correlation between a UWB signal received by a UWB receiver device in a ranging round and a reference STS template, a block error of the UWB signal, or a frequency error of the UWB signal. The geo-tagged A-D FOM data indicates a location at which the ranging round was performed.

The method includes at 920, aggregating the received geo-tagged A-D FOM data based on location to generate channel classification information. At 930, in response to a request for channel classification information for a given location, channel classification information is provided for the given location. The channel classification information may include one or more optimized secure ranging parameters comprise parameters related to a back-search time window, noise floor estimation, or a peak detection threshold associated with the location.

In some examples the method includes performing machine learning on the received geo-tagged A-D FOM data to generate the channel classification information. The channel classification information may characterize a likelihood of a distance shortening attack associated with the location. The method may include determining a subscription status of a source of the request for channel classification information; and selectively providing the channel classification information based on the subscription status.

It can be seen from the foregoing description that the disclosed A-D FOM allow for characterization of a likelihood that a malicious signal component is present in a received STS UWB signal. A-D FOM may be used to generate a security signal indicating an attack. Secure ranging parameters used to detect peaks in the STS UWB signal may be adapted based on the A-D FOM. A-D FOM data may be geo-tagged to allow aggregation of A-D FOM data based on location. In this manner channel classification information may be developed for use in optimizing secure ranging parameters based on the historically experienced attacks for the location.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to provide safety management on a per-application group basis according to embodiments and examples described herein.

EXAMPLES

Example 1 is a method, including, with a UWB receiver device, receiving a UWB signal during a ranging round; correlating the received UWB signal with a reference secure training sequence (STS) template to generate a correlation output; determining a distance between a transmitter of the received UWB signal based on the received UWB signal and the UWB receiver device based on the correlation output and one or more secure ranging parameters, wherein the one or more secure ranging parameters are received from a controller device; based on the correlation output, computing a channel quality indicator that characterizes a noise level of the channel; computing an attack-detection figure of merit (A-D FOM) based on the channel quality indicator, a block error of the received UWB signal, or a frequency error of the received UWB signal; and providing data indicative of the A-D FOM to the controller device. With the controller device, the method includes receiving the data indicative of the A-D FOM from the UWB receiver device and generating a security signal when the A-D FOM exceeds a threshold value.

Example 2 includes the subject matter of example 1, including or omitting optional subject matter, including, with the controller device, optimizing the secure ranging parameters based on the A-D FOM; and transmitting data indicative of the optimized secure ranging parameters to the UWB receiver device for use by the UWB receiver device in processing UWB signals received in subsequent ranging rounds.

Example 3 includes the subject matter of example 2, including or omitting optional subject matter, wherein the one or more secure ranging parameters include parameters related to a back-search time window, noise floor estimation, or a peak detection threshold.

Example 4 includes the subject matter of any of examples 1-3, including or omitting optional subject matter, including, with the controller device, tagging the data indicative of the A-D FOM with an indication of a geographic location of the controller device to generate geo-tagged A-D FOM data; and transmitting the geo-tagged A-D FOM data or data derived from the geo-tagged A-D FOM data to a second device that hosts a repository of geo-tagged A-D FOM data.

Example 5 includes the subject matter of any of examples 1-3, including or omitting optional subject matter, including, with the UWB receiver device, computing the channel quality indicator for the ranging round based on a main peak to early peak (MPEP) differential of the correlation output, an early peak to noise floor differential of the correlation output, and a noise floor of the correlation output.

Example 6 is a controller device, including a processor and a memory, the processor configured to, when executing instructions stored in the memory, cause the controller device to, receive data indicative of an attack-detection figure of merit (A-D FOM), wherein the A-D FOM is based on a correlation between a UWB signal received by a first UWB receiver device and a reference STS template, a block error of the UWB signal, or a frequency error of the UWB signal; and control processing of subsequently received UWB signals based on the data.

Example 7 includes the subject matter of example 6, including or omitting optional subject matter, wherein the processor is configured to cause the controller device to determine at least one optimized secure ranging parameter based on the A-D FOM; and provide the at least one optimized securing ranging parameter to a second UWB receiver device for use in processing received UWB signals.

Example 8 includes the subject matter of example 7, including or omitting optional subject matter, wherein the at least one optimized secure ranging parameter includes parameters related to a back-search time window, noise floor estimation, or a peak detection threshold.

Example 9 includes the subject matter of any of examples 6-8, including or omitting optional subject matter, wherein the processor is configured to cause the controller device to tag the A-D FOM with an indication of a geographic location of the controller device to generate geo-tagged A-D FOM data; and transmit the geo-tagged A-D FOM data or data derived from the geo-tagged A-D FOM data to a second device that hosts a repository of tagged A-D FOM data.

Example 10 includes the subject matter of any of examples 6-8, including or omitting optional subject matter, wherein the processor is configured to determine a geographic location of the controller device; and control processing of subsequently received UWB signals based on geo-tagged A-D FOM data mapped to the geographic location.

Example 11 includes the subject matter of any of examples 6-8, including or omitting optional subject matter, wherein the processor is configured to cause the controller device to request channel classification information for a current location of the controller device from a second device, wherein the channel classification is based on A-D FOM data collected from a plurality of UWB receiver devices; and control processing of subsequently received UWB signals based on the channel classification information received from the second device.

Example 12 includes the subject matter of any of examples 6-8, including or omitting optional subject matter, wherein the processor is configured to cause the controller device to generate a security signal in response to the A-D FOM exceeding a threshold.

Example 13 is an ultra-wideband (UWB) receiver device including a processor and a memory, the processor configured to, when executing instructions stored in the memory, cause the device to receive a UWB signal during a ranging round; correlate the received UWB signal with a reference secure training sequence (STS) template to generate a correlation output; based on the correlation output, computing a channel quality indicator that characterizes a noise level of the channel; and computing an attack-detection figure of merit (A-D FOM) based on the channel quality indicator, a block error of the received UWB signal, or a frequency error of the received UWB signal; and providing data indicative of the A-D FOM to a controller device.

Example 14 includes the subject matter of example 13, including or omitting optional subject matter, wherein the processor is configured to provide the A-D FOM periodically or in response to a request from the controller device.

Example 15 includes the subject matter of example 13, including or omitting optional subject matter, wherein the processor is configured to compute the channel quality indicator for the ranging round based on a main peak to early peak (MPEP) differential of the correlation output, an early peak to noise floor differential of the correlation output, and a noise floor of the correlation output.

Example 16 is a method, including receiving geo-tagged attack-detection figure of merit (A-D FOM) data, wherein the A-D FOM data is based on a correlation between a UWB signal received by a UWB receiver device in a ranging round and a reference STS template, a block error of the UWB signal, or a frequency error of the UWB signal, further wherein the geo-tagged A-D FOM data indicates a location at which the ranging round was performed; aggregating the received geo-tagged A-D FOM data based on location to generate channel classification information; and in response to a request for channel classification information for a given location, providing channel classification information for the given location.

Example 17 includes the subject matter of example 16, including or omitting optional subject matter, including performing machine learning on the received geo-tagged A-D FOM data to generate the channel classification information.

Example 18 includes the subject matter of example 16, including or omitting optional subject matter, wherein the channel classification information characterizes a likelihood of a distance shortening attack associated with the location.

Example 19 includes the subject matter of any of examples 16-18, including or omitting optional subject matter, including determining a subscription status of a source of the request for channel classification information; and selectively providing the channel classification information based on the subscription status.

Example 20 includes the subject matter of any of examples 16-18, including or omitting optional subject matter, wherein the channel classification information includes one or more optimized secure ranging parameters include parameters related to a back-search time window, noise floor estimation, or a peak detection threshold associated with the location.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, AB, AC, BC, and ABC.

What is claimed is:

1. A method, comprising:

with a UWB receiver device, receiving a UWB signal during a ranging round;

correlating the received UWB signal with a reference secure training sequence (STS) template to generate a correlation output;

determining a distance between a transmitter of the received UWB signal based on the received UWB signal and the UWB receiver device based on the correlation output and one or more secure ranging parameters, wherein the one or more secure ranging parameters are received from a controller device;

based on the correlation output, computing a channel quality indicator that characterizes a noise level of the channel;

computing an attack-detection figure of merit (A-D FOM) based on the channel quality indicator, a block error of the received UWB signal, or a frequency error of the received UWB signal; and providing data indicative of the A-D FOM to the controller device, and with the controller device, receiving the data indicative of the A-D FOM from the UWB receiver device; and generating a security signal when the A-D FOM exceeds a threshold value.

2. The method of claim 1, comprising, with the controller device, optimizing the secure ranging parameters based on the A-D FOM; and transmitting data indicative of the optimized secure ranging parameters to the UWB receiver device for use by the UWB receiver device in processing UWB signals received in subsequent ranging rounds.

3. The method of claim 2, wherein the one or more secure ranging parameters comprise parameters related to a back-search time window, noise floor estimation, or a peak detection threshold.

4. The method of claim 1, comprising, with the controller device, tagging the data indicative of the A-D FOM with an indication of a geographic location of the controller device to generate geo-tagged A-D FOM data; and transmitting the geo-tagged A-D FOM data or data derived from the geo-tagged A-D FOM data to a second device that hosts a repository of geo-tagged A-D FOM data.

5. The method of claim 1, comprising, with the UWB receiver device, computing the channel quality indicator for the ranging round based on a main peak to early peak (MPEP) differential of the correlation output, an early peak to noise floor differential of the correlation output, and a noise floor of the correlation output.

6. The method of claim 1, comprising, with the UWB receiver device, computing the A-D FOM based on comparison of a block error value to a threshold or a pattern of block failures.

7. The method of claim 1, comprising, with the UWB receiver device, computing the A-D FOM by detecting high energy pulses in the UWB signal at a fractional frequency with respect to a frequency of pulses in an intended UWB signal.

8. A controller device, comprising a processor and a memory, the processor configured to, when executing instructions stored in the memory, cause the controller device to, receive data indicative of an attack-detection figure of merit (A-D FOM), wherein the A-D FOM is based on a correlation between a UWB signal received by a first UWB receiver device and a reference STS template, a block error of the UWB signal, or a frequency error of the UWB signal; and determine at least one optimized secure ranging parameter based on the A-D FOM; and provide the at least one optimized secure ranging parameter to a UWB receiver device for use in processing of subsequently received UWB signals.

9. The controller device of 8, wherein the processor is configured to cause the controller device to provide the at least one optimized secure ranging parameter to a second UWB receiver device for use in processing received UWB signals wherein the second UWB receiver device is different from the first UWB receiver device.

10. The controller device of claim 8, wherein the at least one optimized secure ranging parameter comprises parameters related to a back-search time window, noise floor estimation, or a peak detection threshold.

11. The controller device of 8, wherein the processor is configured to cause the controller device to tag the A-D FOM with an indication of a geographic location of the controller device to generate geo-tagged A-D FOM data; and transmit the geo-tagged A-D FOM data or data derived from the geo-tagged A-D FOM data to a second device that hosts a repository of tagged A-D FOM data.

12. The controller device of claim 8, wherein the processor is configured to determine a geographic location of the controller device; and determine the at least one optimized secure ranging parameter based on geo-tagged A-D FOM data mapped to the geographic location.

13. The controller device of claim 8, wherein the processor is configured to cause the controller device to request channel classification information for a current location of the controller device from a second device, wherein the channel classification is based on A-D FOM data collected from a plurality of UWB receiver devices; and determine the at least one optimized secure ranging parameter based on the channel classification information received from the second device.

14. The controller device of 8, wherein the processor is configured to cause the controller device to generate a security signal in response to the A-D FOM exceeding a threshold.

15. An ultra-wideband (UWB) receiver device comprising a processor and a memory, the processor configured to, when executing instructions stored in the memory, cause the device to:

receive a UWB signal during a ranging round;

correlate the received UWB signal with a reference secure training sequence (STS) template to generate a correlation output;

based on the correlation output, compute a channel quality indicator that characterizes a noise level of the channel; and compute an attack-detection figure of merit (A-D FOM) based on the channel quality indicator, a block error of the received UWB signal, or a frequency error of the received UWB signal; and provide data indicative of the A-D FOM to a controller device.

16. The UWB receiver device of claim 15, wherein the processor is configured to provide the A-D FOM periodically or in response to a request from the controller device.

17. The UWB receiver device of claim 15, wherein the processor is configured to compute the channel quality indicator for the ranging round based on a main peak to early peak (MPEP) differential of the correlation output, an early peak to noise floor differential of the correlation output, and a noise floor of the correlation output.

18. The UWB receiver device of claim 15, wherein the processor is configured to compute the A-D FOM based on comparison of a block error value to a threshold or a pattern of block failures.

19. The UWB receiver device of claim 15, wherein the processor is configured to compute the A-D FOM by detecting high energy pulses in the UWB signal at a fractional frequency with respect to a frequency of pulses in an intended UWB signal.

20. The UWB receiver device of claim 19, wherein the processor is configured to detect the high energy pulses in the UWB signal based on a fast Fourier transform of the UWB signal.

* * * * *